United States Patent
Qi et al.

(10) Patent No.: US 6,810,185 B2
(45) Date of Patent: Oct. 26, 2004

(54) HIGHER ORDER MODE STRIPPING OPTICAL FIBER AND MODULES AND SYSTEMS UTILIZING THE SAME

(75) Inventors: Gang Qi, Painted Post, NY (US); William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 387 days.

(21) Appl. No.: 10/061,549

(22) Filed: Jan. 31, 2002

(65) Prior Publication Data

US 2003/0142940 A1 Jul. 31, 2003

(51) Int. Cl.[7] ............................ G02B 6/02; H04J 14/02
(52) U.S. Cl. ........................ 385/127; 385/128; 398/81
(58) Field of Search ................................ 385/123, 127, 385/128, 135, 136, 137; 398/29, 81

(56) References Cited

U.S. PATENT DOCUMENTS

| | | | |
|---|---|---|---|
| 5,887,104 A | * 3/1999 | Sugizaki et al. | ............ 385/123 |
| 6,363,196 B1 | * 3/2002 | Rousseau et al. | ........... 385/127 |
| 6,490,398 B2 | * 12/2002 | Gruner-Nielsen et al. | .. 385/123 |
| 2002/0097972 A1 | 7/2002 | Sasaoka et al. | ............. 385/124 |

FOREIGN PATENT DOCUMENTS

| | | |
|---|---|---|
| EP | 1 107 028 A1 | 6/2001 |
| EP | 1 170 604 A2 | 1/2002 |
| JP | 2000 338353 | 8/2000 |
| WO | WO 01/11402 A1 | 2/2001 |

OTHER PUBLICATIONS

"New 50–Micron Fiber Optimized for 10–GbE Applications", Lightwave, Apr. 2002, pp. 32 and 34.

*Patent Abstracts of Japan*—2000 338353—English translation (1 page).

* cited by examiner

*Primary Examiner*—Frank G. Font
*Assistant Examiner*—Michael A. Lyons
(74) *Attorney, Agent, or Firm*—Randall S. Wayland

(57) ABSTRACT

A higher order mode stripping optical fiber having a core surrounded and a cladding layer surrounded by a coupling coating having a higher refractive index than the higher order mode effective index and wherein the cladding-coating interface between the cladding and the coupling coating is located at a radius <55 microns. The measured cutoff wavelength of the fiber is preferably >1500 nm. Such fibers are particularly effective at attenuating unwanted higher order modes and are useful in Dispersion Compensating modules (DCM's). Modules and systems utilizing the higher order mode stripping fiber are also described.

42 Claims, 4 Drawing Sheets

US 6,810,185 B2

HIGHER ORDER MODE STRIPPING OPTICAL FIBER AND MODULES AND SYSTEMS UTILIZING THE SAME

FIELD OF THE INVENTION

The present invention relates to optical waveguide fibers that are suitable for use in optical telecommunication systems, more particularly to optical fibers that are particularly well suited for use in single mode operation.

BACKGROUND OF THE INVENTION

Dispersion management is very important for Non-Zero Dispersion Shifted Fibers (NZDSF). In particular, it is desired to have small residual dispersion for the transmission system across the entire transmission band. Since the dispersion of NZDSF varies as a function of wavelength, dispersion compensation is desired. In order to compensate for slope of the NZDSF fiber with a fairly short fiber length of Dispersion Compensating (DC) fiber, a DC fiber having a large negative slope is desired. However, in designing a high slope DC fiber, several problems are encountered. These problems are: 1) Multi-Path Interference (MPI), Insertion Loss (IL), and dispersion linearity as a function of wavelength. A single-moded fiber solution is best for controlling MPI. However, the IL for typical single-mode fiber designs makes them generally unattractive. Dispersion linearity is also difficult to achieve in single-mode fiber designs. Thus, few-moded designs have been the desired solution that meet the IL and dispersion linearity requirements. However, these fibers generally have unacceptable MPI.

Consequently, it would be desirable to have an optical fiber that propagates in the fundamental mode $LP_{01}$ without appreciable attenuation, while at the same time, filtering out the higher order modes such as $LP_{02}$ and $LP_{11}$. Such a fiber would exhibit single-moded operation.

SUMMARY OF THE INVENTION

In accordance with one embodiment of the present invention, an optical fiber is provided having a core, a cladding, and a coupling coating wherein the cladding-coating interface is located at a radius (Ri) less than 55 microns; more preferably less than 50 microns; and most preferably less than 45 microns from the fiber's centerline. This embodiment advantageously enables Higher Order Modes (HOMs) (e.g., $LP_{11}$, $LP_{02}$ light propagation modes) to be efficiently filtered out upon sufficient bending of the optical fiber. For example, in operation, the HOMs will be filtered out when a sufficient length of the fiber is wound onto a sufficiently small diameter spool in a Dispersion Compensating (DC) module. In particular, the cladding thickness is reduced to less than 55 microns from a conventional thickness of 62.5 microns. Advantageously, the outer diameter of the fiber's coating may be made smaller thereby resulting in a fiber with a smaller overall outside diameter thereby using lesser amounts of cladding glass and coating materials to manufacture. Additionally, longer lengths of optical fiber may be wound onto standard sized spools or the same lengths of such fibers may be packaged in a smaller volume. This is particularly useful for reducing the overall size of DC modules. By way of example, the amount of glass utilized in the fiber may be reduced by 20% to 75% and the amount of coating utilized may be reduced by as much as 30%. Thus, the present invention may be employed, for example, to manufacture DC modules at lesser cost and in significantly smaller packages.

One preferred optical fiber according to the present invention has a core, a cladding layer, a coupling coating abutting the cladding layer at a cladding-coating interface, the coupling coating has a refractive index higher than the cladding layer and the cladding-coating interface is positioned at radius of less than 55 microns from a centerline of the optical fiber such that higher order mode attenuation is enhanced as compared to fundamental mode attenuation, and a measured cutoff wavelength ($\lambda c$) of the optical fiber is greater than 1500 nm.

According to further embodiments of the invention, the cladding-coating interface is positioned at less than 50 microns from the centerline of the optical fiber; and more preferably less than 45 microns from the centerline of the optical fiber. In accordance with preferred ranges, the cladding-coating interface is positioned at greater than 30 microns and less than 50 microns from the centerline of the optical fiber; more preferably greater than 35 and less than 50 microns from the centerline; and most preferably greater than 40 and less than 50 microns from the centerline.

In one preferred embodiment, the fiber is a Dispersion Compensating (DC) fiber wherein the core has a refractive index profile having a central core segment having a positive delta ($\Delta 1$), and a moat segment surrounding the central core segment having a negative delta ($\Delta 2$). The DC fiber preferably also includes a ring segment surrounding the moat segment having a positive delta ($\Delta 3$).

According to another embodiment of the invention, a dispersion compensating module is provided, comprising a winding spool, a dispersion compensating fiber wound onto the spool, the dispersion compensating fiber including a core, a cladding layer, a coupling coating having a refractive index higher than the cladding layer, and a cladding-coating interface at a point of interface between the cladding layer and the coupling coating, the cladding-coating interface being positioned at a radius of between 35 and 50 microns from a centerline of the dispersion compensating fiber, and the dispersion compensating fiber exhibits a measured cutoff wavelength ($\lambda c$) greater than 1500 nm.

An optical transmission system is provided in accordance with another embodiment of the invention. The system comprises a transmitter, a length of optical transmission fiber optically coupled to the receiver, said length being greater than 10 km, a dispersion compensating fiber optically coupled to the transmission fiber, said dispersion compensating fiber including a core, a cladding layer, a coupling coating abutting the cladding layer at a cladding-coating interface, the coupling coating having a refractive index higher than the cladding layer wherein the cladding-coating interface is positioned at radius of less than 55 microns from a centerline of the optical fiber such that higher order mode attenuation is enhanced as compared to fundamental mode attenuation, and a receiver optically coupled to the dispersion compensating fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, an example of which is illustrated in the accompanying drawings. Wherever possible, the same reference numbers will be used throughout the drawings to refer to the same or like parts.

Figure 1:
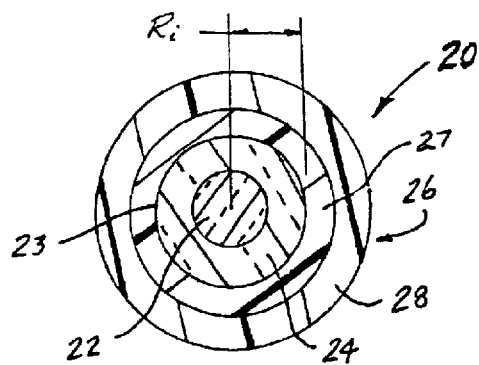
FIG. 1 illustrates a cross-sectional end view of an optical fiber in accordance with the invention.
Figure 2:
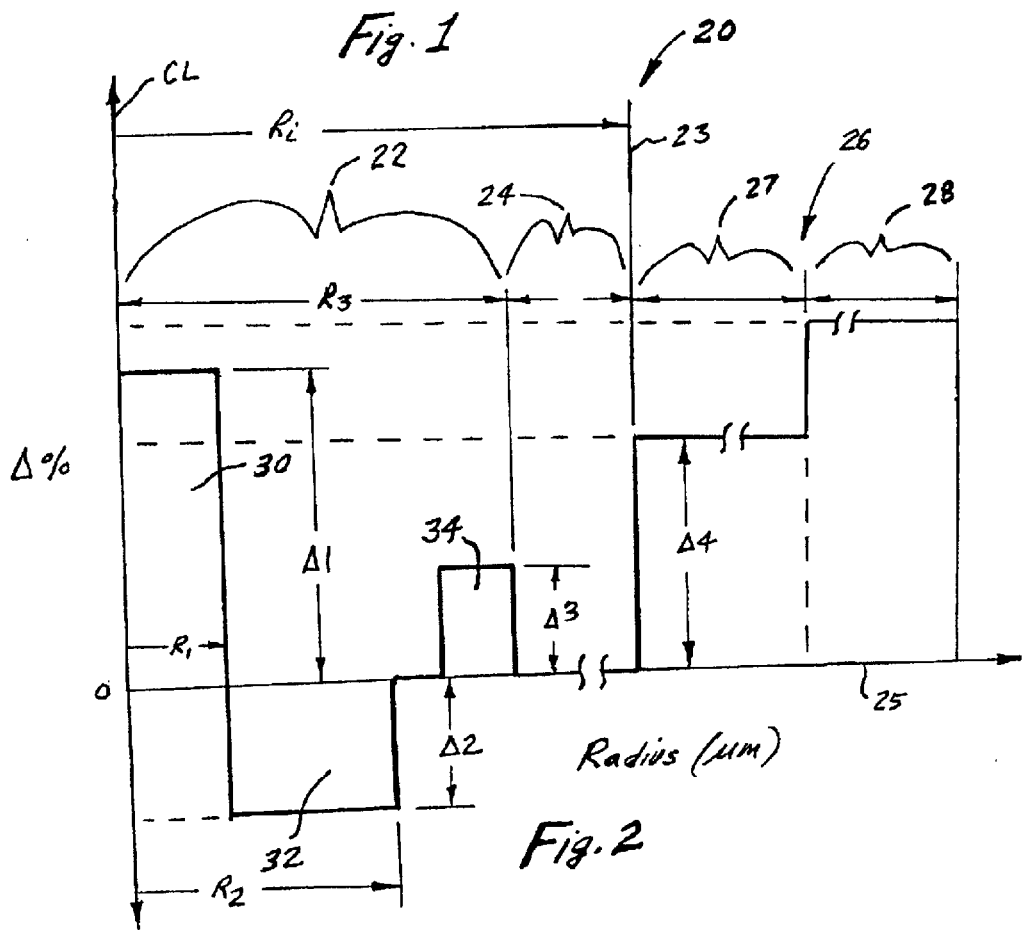
FIG. 2 illustrates refractive index profile of an embodiment of optical fiber in accordance with the invention.

A cross-sectional end view of an exemplary optical fiber 20 in accordance with the invention is illustrated in FIG. 1. Optical fiber 20 includes a core 22, a cladding 24, and a coupling coating 26. A cladding-coating interface 23 in accordance with the invention is selectively positioned at a radius Ri measured from the fiber's centerline (CL). Ri is positioned at less than 55 microns; more preferably less than 50 microns; and most preferably less than 45 microns from the centerline. Preferably, the dimension Ri may range between 30 and 50 microns from the centerline of the optical fiber 20; more preferably between 35 and 50 microns from the centerline; and most preferably between 40 and 50 microns from the centerline. The fiber 20 also includes a coupling coating 26 such as a urethane acrylate coating, that may be made up of a primary coating 27 and a secondary coating 28. As is illustrated in FIG. 2, one preferred segmented core structure of the fiber 20 is shown. The fiber 20 is preferably a dispersion compensating fiber with a refractive index profile that has a physical core 22 with a positive delta central core segment 30 and a negative delta moat segment 32. The core 22 preferably also includes a positive delta ring segment 34.

In the exemplary embodiment of fiber 20 in accordance with the present invention shown in FIG. 2, the refractive index profile exhibits an up-doped central core segment 30 having maximum positive delta ($\Delta 1$) which is surrounded by a down-doped moat segment 32 having maximum negative (most negative) delta ($\Delta 2$), which is, in turn, surrounded by up-doped ring segment 34 having a maximum positive delta ($\Delta 3$), all of which are surrounded by annular cladding layer 24. The inside edge of the ring segment 34 is preferably spaced from the edge of the moat segment 32. Preferably, segments 30 and 34 are formed using germania-doped $SiO_2$, although other forms of index refraction increasing up-dopants could also be employed to achieve the fibers disclosed herein, so long as the same general refractive index profile is achieved. Contrarily, moat segment 32 is preferably formed using fluorine doped $SiO_2$, however, other index of refraction decreasing down-dopants may be employed besides fluorine. Cladding layer 24 is preferably formed of pure silica. However, cladding layer 24 could also include index of refraction increasing or decreasing in dopants, so long as the coupling coating's refractive index is higher than that of the cladding layer 24.

The coupling coating 26 is positioned such that it functions to strip out (attenuate) any higher order modes propagating in the fiber 20 upon any significant fiber bending. In particular, for DC modules, the bending is initiated by winding the fiber onto a spool of less than approximately 254 mm in diameter (see FIG. 7). In particular, the coupling coating 26 preferably includes a primary coating 27 that has a refractive index delta ($\Delta 4$) greater than that of the cladding layer 24 and that is preferably positive. The coupling coating 26 is preferably a light-absorbent polymer material, such as urethane acrylate. The preferred properties of the primary coating 27 adjacent to the cladding 24 are that it has a refractive index $\Delta\%$ of greater than 1.0%; and more preferably greater than 2.0% at 1550 nm. Theoretically, the refractive index $\Delta\%$ of the coupling coating only needs to be higher than the effective refractive index of the HOM to be stripped. The primary coating 27 preferably has an elastic modulus of less than 5 Mpa when tested at room temperature using ASTM 882-97. The secondary coating 28 is typically applied over the primary coating 27 and has a higher elastic modulus of greater than about 650 Mpa when tested at room temperature using ASTM 882-97. The refractive index $\Delta\%$ of the secondary coating 28 is typically greater than about 3%; and more preferably greater than about 5% at 1550 nm. The coupling coating 26 typically consists of only the primary coating, but depending upon the power field of the fiber profile, the thickness of the cladding, and the thickness of the primary coating, the coupling coating may optionally consist of the primary and secondary coating, in combination. Although the preferred coupling coating 26 is a polymer material, other suitable coatings may be used as well. For example, the coating may be a metallic coating (e.g., titanium or tantalum) or carbon coating. The coating thickness may have a thickness of between about 5 to 20 microns.

Figure 3:
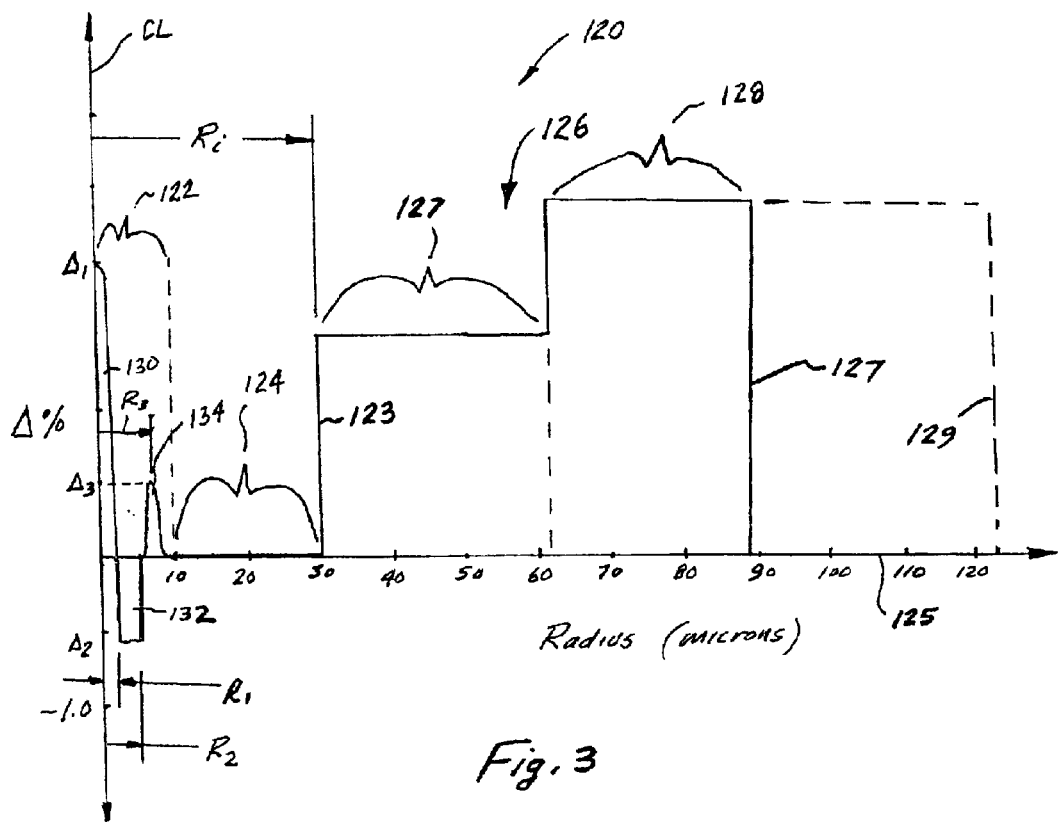
FIG. 3 illustrates refractive index profile of another embodiment of optical fiber in accordance with the invention.

A preferred embodiment of a dispersion compensating optical fiber 120 in accordance with the invention is illustrated in FIG. 3. In this embodiment of fiber, $\Delta 1$ ranges between 1.0% and 3.0% and comprises an outer radius $R_1$ ($R_1$ is drawn the same as in FIG. 1, to the point where the core segment 130 intersects the x-axis 125) of between about 1 and 3 microns. The core segment 130 has an alpha profile where alpha is about 2.0. $\Delta 2$ is preferably less than about −0.3%, more preferably less than −0.4%, most preferably less than −0.5%, and has an outer radius $R_2$ (measured at the intersection of the outermost portion of the moat segment 132 with the x-axis 125) which ranges between about 3.5 and 8 microns. $\Delta 3$ is between about 0.2% to 1.2% and comprises a center radius $R_3$ (drawn from the centerline (CL) to the center of the ring segment 134) between about 5 to 12 microns. Ri, as used herein, means the distance measured from the centerline (CL) of the optical fiber 120 to the interface between the outermost portion of the glass cladding layer 124 with the coupling coating 126, i.e., to the cladding-coating interface 123.

More preferably, Δ1 of segment 12 is between 1.6% and 2.4% and comprises an outer radius $R_1$ between about 1 to 3 microns, Δ2 of segment 14 is between than about −0.4 and −1.0 percent, and has an outer radius $R_2$ between about 4 and 7 microns. The ring segment 134 preferably has a Δ3 between about 0.2% to 1.0% and a center radius $R_3$ between about 5 to 12 microns. The dispersion compensating optical fiber has a total dispersion at 1550 nm less than −20 ps/nm-km. Similar to the fiber 20 shown in FIG. 2, the fiber of FIG. 3 preferably also includes both a primary 127 and secondary 128 coating.

Figure 4:
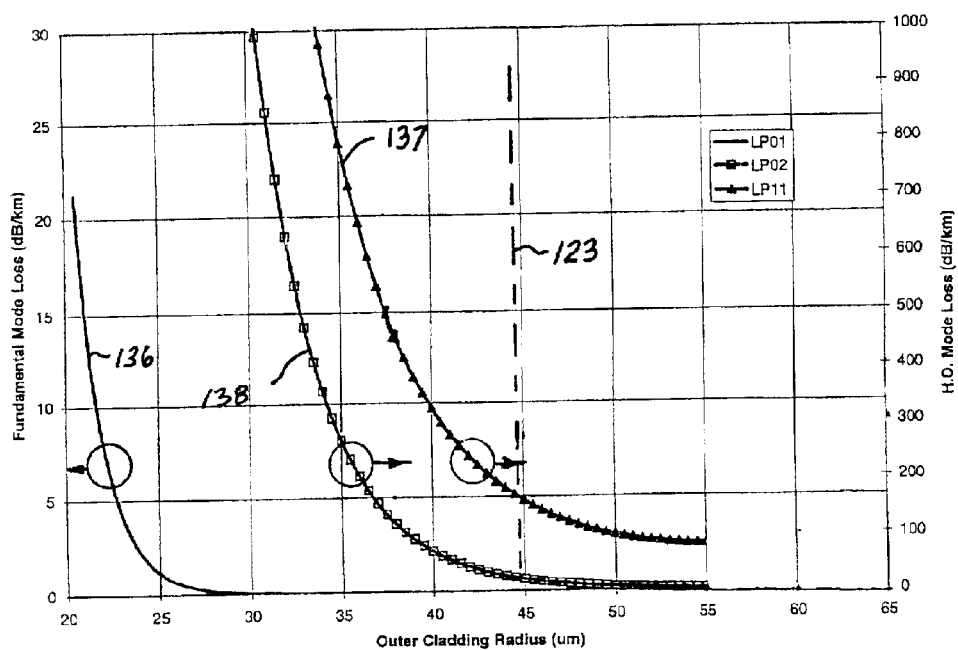
FIG. 4 illustrates a plot of cladding radius (microns) vs. loss (dB/km) of the fundamental and higher order modes of an embodiment of optical fiber in accordance with the invention. Fundamental mode loss is on the left hand axis, whereas HOM loss is on the right hand axis.

As best shown in FIG. 4, is a plot of the fundamental mode loss versus outer cladding radius for an optical fiber having the refractive index profile shown in FIG. 3. Also plotted is the Higher Order (H.O.) Mode Loss versus outer cladding radius. As can be readily seen from the plot, if the cladding-coating interface 123 is located too far to the right on the plot (too far radially outward in the fiber), then the attenuation (loss) in the higher order modes, particularly, the $LP_{02}$ mode, will not be high enough and, thus, the $LP_{02}$ mode will not be stripped away and may propagate for a significant length in the fiber. This may result in undesirably high Multiple Path Interference (MPI) when the signal reaches the receiver (see FIG. 6). Generally, it is desired to have the interface positioned such that MPI is less than 40 dB at 1550 nm.

It was discovered by the inventors, that moving the cladding-coating interface 123 radially inward from its standard location at a radius of 62.5 microns increases the dB/km loss of the Higher Order Modes (HOMs) thereby facilitating preferential stripping out (attenuation) of the $LP_{11}$ and $LP_{02}$ HOMs. The best position for the interface 123 will depend upon the intensity field spectrum in the optical fiber. The goal of placement of the interface 123 is to adequately strip out the HOMs while not appreciably affecting the fundamental $LP_{01}$ mode propagation at 1550 nm. In order to adequately attenuate HOMs for a typical DC module wound with DC fiber of the type taught in FIG. 3 on a less than 254 mm diameter spool, the loss in the HOM should be sufficient to attenuate the HOMs within a length of less than several km (but in all cases in a length less than the length of the DC fiber on the spool). Generally speaking, the interface 123 should be positioned such that the HOM loss (in either the $LP_{11}$ or $LP_{02}$ mode, or both) is greater than about 10 dB/km at 1550 nm. In particular, the HOMs may be so coupled that attenuation of one HOM also substantially attenuates the other HOM. Preferably also, the cladding coating interface should be placed far enough radially outward so that the attenuation of the fundamental mode ($LP_{01}$) is inappreciable in comparison to the attenuation of the HOMs. Attenuation of the fundamental mode is preferably less than 0.5 dB/km; and more preferably less than 0.1 dB/km at 1550 nm. The inventors herein have recognized that moving the interface too far radially inward will cause microbending sensitivity to become worse. In the plot of FIG. 4, line 136 represents the fundamental mode ($LP_{01}$) loss of the fiber 120 at 1550 nm as a function of outer cladding radius. Plots 137 and 138 represent the HOM loss of the $LP_{11}$ and $LP_{02}$ modes, respectively, as a function of the outer cladding radius at 1550 nm. Line 123 on the plot illustrates one interface location where the afore-mentioned criteria are met.

Figure 5:
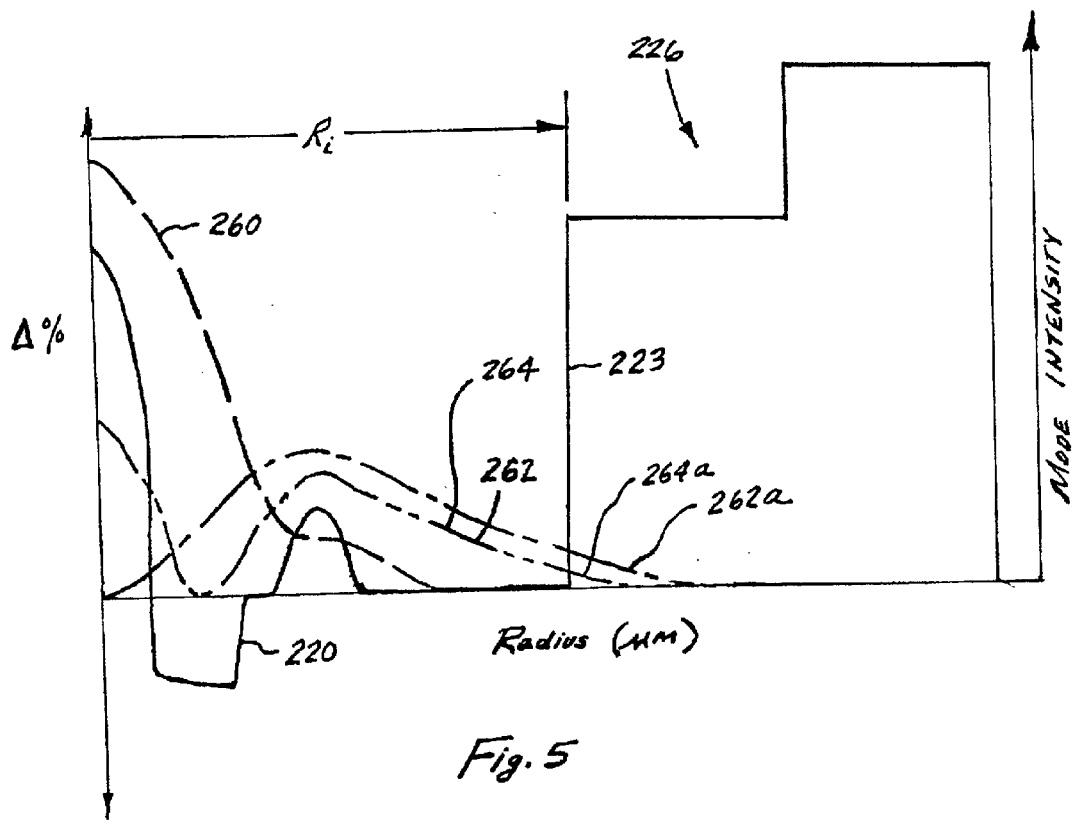
FIG. 5 illustrates a heuristic plot of radius (microns) vs. power (of the fundamental and higher order modes ) and $\Delta\%$ of an embodiment of optical fiber in accordance with the invention. The higher order mode power in the cladding and coating is exaggerated for clarity.

FIG. 5 illustrates graphically how the HOM stripping fiber invention operates. In practice, the cladding-coating interface 223 is positioned and located at a radial position (Ri) where the fundamental ($LP_{01}$) mode attenuation is inappreciably affected (see example above). In the $LP_{01}$ plot, labeled 260, the fundamental mode intensity present outward of the interface 223 is minimal. In contrast, the tails 262a, 264a of intensity fields of the $LP_{11}$ and $LP_{02}$ modes, labeled 262 and 264, respectively, extend into the coupling coating 226. Thus, as that portion of the HOM light signal enters into the high refractive index coating 226, the light signal is significantly attenuated in that mode. The fiber refractive index profile 220 is superimposed on the plot to show an approximate intensity relationship as compared to the location of the various features (core, moat, ring, etc.) of the refractive index profile. As should be recognized, the interface 223 is positioned far enough radially inward such that the intensity in the coupling coating 226 of at least one of the HOMs is sufficiently high (see examples above) to substantially attenuate that mode while being located far enough radially outward such that the fundamental mode attenuation is inappreciable affected (see examples above). It should be recognized that the actual intensities in the cladding and coating of the modes shown have been greatly exaggerated for clarity and illustration purposes.

Figure 6:
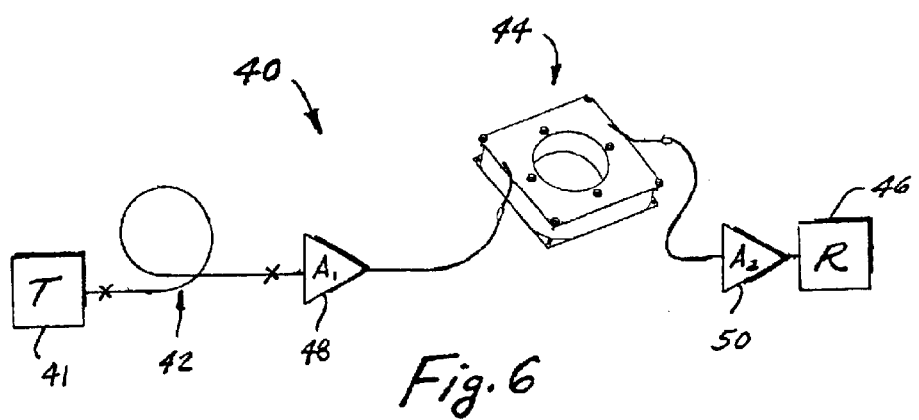
FIG. 6 illustrates an optical transmission system including an embodiment of optical fiber in accordance with the invention.

FIG. 6 illustrates an optical transmission system including the DC fiber in accordance with another embodiment of the invention. The system 40 has transmitter (T) 41 capable of launching an optical signal(s) into a length of transmission fiber 42 optically coupled to it by a splice (shown as the x) or other suitable coupling apparatus. A DC module 44 is also included in the system 40 (see exploded view in FIG. 7). The module 44 has housed within it, a dispersion compensating fiber 20 or 120 in accordance with the invention, such as the fiber described with reference to FIGS. 2 and 3. The DC fiber is optically coupled to the transmission fiber 42 and to a receiver (R) 46. As is in the previous fiber embodiments, the dispersion compensating fiber 20, 120 included in the module 44 includes a core, a silica-containing cladding layer, and a polymer coupling coating abutting the cladding layer at a cladding-coating interface. As before described, the polymer coupling coating has a refractive index higher than the cladding layer and the cladding-coating interface is selectively positioned at radius of less than 55 microns from a centerline of the optical fiber. Thus, in the system, HOM attenuation in the DC fiber of the module 44 is enhanced as compared to fundamental mode attenuation. Although, the system 40 is described in terms of a transmitter 41 and a receiver 46 with unidirectional signals, it should be recognized that the system 40 may have signals traveling in both direction, as well. The system 40 may also include amplifiers, such as pre-amp 48 and power amp 50. Other conventional system components may also be included.

The dispersion compensating optical fiber 20, 120 in the system preferably has a measured cutoff wavelength (λc) that is greater than 1500 nm. All cutoff measurements are performed on a 2 meter length of the fiber on a Photon Kinetics bench, for example, using a FOTP 80 method. As in the previously described embodiments, the cladding-coating interface of the DC fiber in the module 44 is positioned at radius of greater than 30 microns but less than 50 microns from a centerline of the optical fiber.

More preferably, the cladding-coating interface is positioned at radius of less than 50 microns from a centerline of the optical fiber; and most preferably less than 45 microns from a centerline of the optical fiber. The DC fiber housed in the module 44 preferably has an outermost radius (outside diameter 127) that is less than 100 microns; and more preferably less than 90 microns. Of course, the DC fiber may have a conventional outside diameter of 250 microns by having the coating extend to a radius of 125 microns, as is illustrated by dotted line 129.

Figure 7:
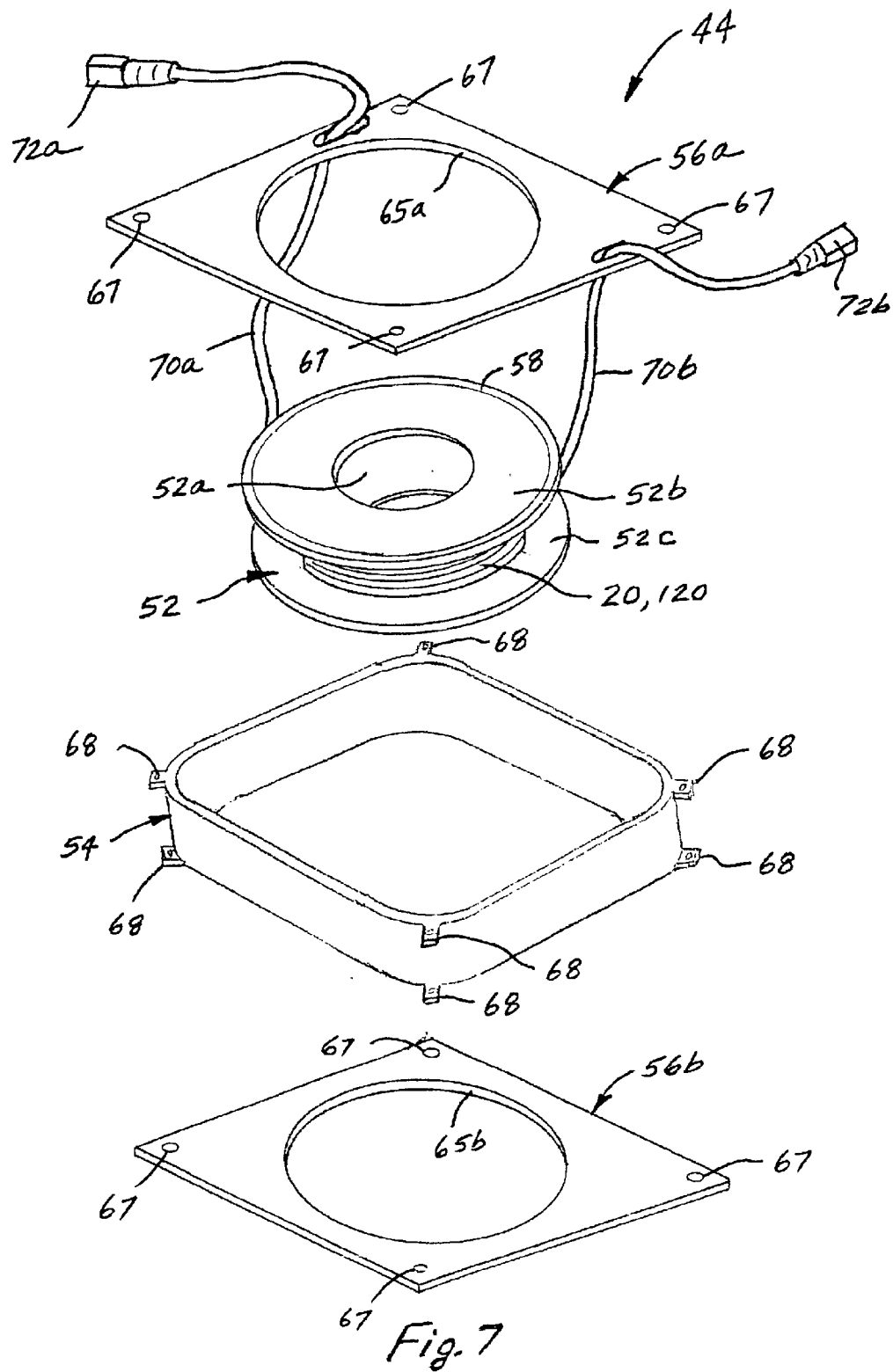
FIG. 7 illustrates an exploded view of a dispersion compensating module including an embodiment of optical fiber in accordance with the invention.

FIG. 7 illustrates the preferred construction of a DC module 44 in accordance with an embodiment of the invention. DC module 44 includes a spool 52 having a cylindrical center 52a preferably of less than 254 mm in diameter and end flanges 52b, 52c. The DC fiber 20 is wound about the center 52a and abuts the inside surfaces of flanges 52b, 52c. Typically, 1 km to about 5 km of DC fiber 20 is wound onto the spool 52 and is used to compensate for about 100 km of transmission fiber 42 (such as a NZDSF) in the system 40 (FIG. 6). The spool 52 is packaged and held in a housing assembly including a center 54 and top and bottom plates 56a, 56b. The spool 52 includes slight annular recesses formed in the outer facing peripheries of the flanges 52b, 52c. These recesses fit in holes 65a, 65b in the plates 56a, 56b such that the spool is centered and located therewith. The plates 56a, 56b are secured to the center 54 by fasteners (not shown) which are inserted through bores 67 and into tabs 68. Pigtail cables 70a, 70b of preferably SM fiber are secured to either end of the DC fiber 20 and connectors 762a, 72b facilitate attachment to the system components.

It will be apparent to those skilled in the art that various modifications and variations can be made to the present invention without departing from the scope of the invention. Thus, it is intended that the present invention covers the modifications and variations of this invention provided they come within the scope of the appended claims and their equivalents.

What is claimed is:

1. An optical fiber, comprising:
   a core,
   a cladding layer,
   a coupling coating abutting the cladding layer at a cladding-coating interface, the coupling coating having a refractive index higher than the cladding layer and the cladding-coating interface is positioned at radius of less than 55 microns from a centerline of the optical fiber such that higher order mode attenuation is enhanced as compared to fundamental mode attenuation, and
   a measured cutoff wavelength ($\lambda c$) of the optical fiber is greater than 1500 nm.

2. The optical fiber of claim 1 the cladding-coating interface is positioned at less than 50 microns from the centerline of the optical fiber.

3. The optical fiber of claim 1 the cladding-coating interface is positioned at less than 45 microns from the centerline of the optical fiber.

4. The optical fiber of claim 1 wherein the cladding-coating interface is positioned at greater than 30 and less than 50 microns from the centerline of the optical fiber.

5. The optical fiber of claim 1 wherein the cladding-coating interface is positioned at greater than 35 and less than 50 microns from the centerline of the optical fiber.

6. The optical fiber of claim 1 wherein the cladding-coating interface is positioned at greater than 40 and less than 50 microns from the centerline of the optical fiber.

7. The optical fiber of claim 1 wherein the core has a refractive index profile having
   a central core segment having a positive delta ($\Delta 1$), and
   a moat segment surrounding the central core segment having a negative delta ($\Delta 2$).

8. The optical fiber of claim 7 wherein the core further includes a ring segment surrounding the moat segment having a positive delta ($\Delta 3$).

9. The optical fiber of claim 1 wherein an outermost radius of the fiber is less than or equal to 100 microns.

10. The optical fiber of claim 9 wherein the outermost radius is less than or equal to 90 microns.

11. The optical fiber of claim 1 wherein the coupling coating is a polymer.

12. The optical fiber of claim 11 wherein the coupling coating is a primary coating layer.

13. The fiber of claim 11 wherein the coupling coating comprises a urethane acrylate.

14. The optical fiber of claim 1 wherein the coupling coating includes a metal.

15. The optical fiber of claim 1 wherein the coupling coating includes carbon.

16. The optical fiber of claim 1 wherein the coupling coating exhibits a delta ($\Delta 4$) of greater than 1%.

17. The optical fiber of claim 1 wherein a loss in the fiber propagating in a higher order mode is greater than 10 dB/km when wound onto a spool having a winding diameter of less than 254 mm.

18. The optical fiber of claim 1 wherein a fundamental mode loss in the fiber in a $LP_{01}$ mode is less than 0.5 dB/km when wound onto a spool having a winding diameter of less than 254 mm.

19. The optical fiber of claim 18 wherein the fundamental mode loss in the fiber in a $LP_{01}$ mode is less than 0.1 dB/km.

20. The optical fiber of claim 1 wherein the fiber is a dispersion compensating fiber.

21. The optical fiber of claim 1 wherein the dispersion compensating fiber has a total dispersion at 1550 nm more negative than $-20$ ps/nm-km.

22. A dispersion compensating optical fiber, comprising:
    a core having at least a central core segment having a positive delta ($\Delta 1$) and a moat segment surrounding the central core segment having a negative delta ($\Delta 2$),
    a silica-containing cladding layer surrounding the core,
    a coupling coating abutting the cladding layer at a cladding-coating interface, the coupling coating having a refractive index higher than the silica-containing cladding layer and the cladding-coating interface is positioned such that a higher order mode attenuation loss of at least one mode selected from the group of the $LP_{11}$ and $LP_{02}$ modes at 1550 nm is at least 10 dB/km.

23. The dispersion compensating optical fiber of claim 22 wherein a measured cutoff wavelength ($\lambda c$) of the fiber is greater than 1500 nm.

24. The dispersion compensating optical fiber of claim 22 wherein the coupling coating is a polymer.

25. A dispersion compensating module, comprising:
    a winding spool,
    a dispersion compensating fiber wound onto the winding spool, the dispersion compensating fiber including
    a core,
    a cladding layer surrounding the core,
    a coupling coating having a refractive index higher than the cladding layer, and
    a cladding-coating interface at a point of interface between the cladding layer and the coupling coating, the cladding-coating interface being positioned at a radius of between 35 and 50 microns from a centerline of the dispersion compensating fiber.

26. The dispersion compensating module of claim 25 wherein said dispersion compensating fiber has a measured cutoff wavelength ($\lambda c$) greater than 1500 nm.

27. The dispersion compensating module of claim 25 wherein the coupling coating is a polymer.

28. The dispersion compensating module of claim 25 wherein the cladding-coating interface is positioned such that a higher order mode attenuation loss in the module of at least one mode selected from the group of the $LP_{11}$ and $LP_{02}$ modes at 1550 nm is at least 10 dB/km.

29. The dispersion compensating module of claim 25 wherein a fundamental mode loss in the dispersion compensating fiber in a $LP_{01}$ mode is less than 0.5 dB/km when wound onto a spool having a winding diameter of less than 254 mm.

30. The dispersion compensating module of claim 29 wherein the fundamental mode loss in the dispersion compensating fiber in a $LP_{01}$ mode is less than 0.1 dB/km.

31. The dispersion compensating module of claim 25 wherein an outermost radius of the dispersion compensating fiber is less than or equal to 100 microns.

32. The dispersion compensating module of claim 31 wherein the outermost radius is less than or equal to 90 microns.

33. An optical transmission system, comprising:
   a transmitter,
   a length of optical transmission fiber optically coupled to the receiver, said length
   being greater than 10 km,
   a dispersion compensating fiber optically coupled to the transmission fiber, said
   dispersion compensating fiber including
      a core,
      a cladding layer,
      a coupling coating abutting the cladding layer at a cladding-coating interface, the coupling coating having a refractive index higher than the cladding layer wherein the cladding-coating interface is positioned at radius of less than 55 microns from a centerline of the optical fiber such that higher order mode attenuation is enhanced as compared to fundamental mode attenuation, and
   a receiver optically coupled to the dispersion compensating fiber.

34. The dispersion compensating optical fiber of claim 33 wherein a measured cutoff wavelength ($\lambda c$) of the optical fiber is greater than 1500 nm.

35. The optical transmission system of claim 33 wherein the cladding-coating interface is positioned at radius of greater than 30 microns but less than 50 microns from a centerline of the optical fiber.

36. The optical transmission system of claim 33 wherein the cladding-coating interface is positioned at radius of less than 45 microns from a centerline of the optical fiber.

37. The optical transmission system of claim 33 wherein the cladding-coating interface is positioned at greater than 40 microns but less than 50 microns from a centerline of the optical fiber.

38. The optical transmission system of claim 33 wherein an outermost radius of the optical fiber is less than or equal to 100 microns.

39. The optical transmission system of claim 38 wherein an outermost radius is less than or equal to 90 microns.

40. The optical transmission system of claim 33 wherein the dispersion compensating optical fiber is housed in a module.

41. The optical transmission system of claim 33 wherein the dispersion compensating optical fiber has a total dispersion at 1550 nm more negative than −20 ps/nm-km.

42. The optical transmission system of claim 33 wherein the coupling coating is selected from the group consisting of a polymer, a metal, and carbon.

* * * * *